United States Patent
Kim

(10) Patent No.: US 6,962,293 B2
(45) Date of Patent: Nov. 8, 2005

(54) CIRCUIT FOR GENERATING CLOCK SIGNAL AND DECODING DATA SIGNAL FOR USE IN CONTACTLESS INTEGRATED CIRCUIT CARD

(75) Inventor: Ki-Yeol Kim, Gunpo-shi (KR)

(73) Assignee: Samsung Electronics Co., Ltd. (KR)

(*) Notice: Subject to any disclaimer, the term of this patent is extended or adjusted under 35 U.S.C. 154(b) by 166 days.

(21) Appl. No.: 10/465,062

(22) Filed: Jun. 19, 2003

(65) Prior Publication Data

US 2004/0076250 A1 Apr. 22, 2004

(30) Foreign Application Priority Data

Sep. 26, 2002 (KR) .............................. 02-58393

(51) Int. Cl.$^7$ .............................................. G06K 19/06
(52) U.S. Cl. ..................... 235/492; 235/441; 235/451
(58) Field of Search .............................. 235/492, 441, 235/451

(56) References Cited

U.S. PATENT DOCUMENTS

| | | | |
|---|---|---|---|
| 3,689,885 A | 9/1972 | Kaplan et al. | 340/152 T |
| 3,991,265 A | * 11/1976 | Fukuda et al. | 386/104 |
| 4,206,323 A | * 6/1980 | Padgett et al. | 340/825.74 |
| 4,532,635 A | * 7/1985 | Mangulis | 375/141 |
| 5,293,399 A | 3/1994 | Hefti | 375/7 |
| 5,360,967 A | 11/1994 | Perkin et al. | 235/375 |
| 5,457,461 A | * 10/1995 | Schuermann | 342/42 |
| 5,548,291 A | * 8/1996 | Meier et al. | 340/10.34 |
| 6,362,738 B1 | 3/2002 | Vega | 340/572.1 |
| 6,617,172 B2 | * 9/2003 | Usami | 438/2 |

FOREIGN PATENT DOCUMENTS

JP 05307369 A * 11/1993 ............ G09G/3/36

OTHER PUBLICATIONS

International Standards Organization, ISO/IEC JTC 1/SC 17, "Identification cards–Contactless integrated circuit card(s)—Proximity cards–Part 1: Physical characteristics," Oct. 20, 1999, pp. 1–5.

International Standards Organization, ISO/IEC JTC 1/SC 17, "Identification cards–Contactless integrated circuit card(s)—Proximity cards–Part 2: Radio frequency power and signal interface," Jul. 13, 2000, pp. 1–11.

International Standards Organization, ISO/IEC JTC 1/SC 17, "Identification cards–Contactless integrated circuit card(s)—Proximity cards–Part 3: Initialization and anticollision," Jul. 13, 2000, pp. 1–48.

* cited by examiner

Primary Examiner—Thien M. Le
Assistant Examiner—Uyen-Chau N. Le
(74) Attorney, Agent, or Firm—Mills & Onello, LLP

(57) ABSTRACT

Disclosed is an integrated circuit card which includes a circuit for generating a clock signal and for restoring data. The circuit includes a receiver for receiving a radio frequency signal having a pause period; a divider for dividing the received signal; a first counter for counting a period of the divided signal at each non-pause period of the received signal; a second counter for counting a period of the divided signal; and a decoder for generating a synchronous clock signal and a decoded data signal in response to outputs of the first and second counters. The second counter is reset by the synchronous clock signal. The circuit is capable of generating a synchronous clock signal and decoding a received data signal so as to be compatible with ISO/IEC 14443 Type A protocol, based on the received radio frequency signal that is transferred from a card reader.

16 Claims, 6 Drawing Sheets

ASK 100%
Modified Miller, 106kbit/s

Load Modulation
Subcarrier f/16
OOK
Manchester,106kbit/s

Fig. 3A

| S | b1 | b2 | b3 | b4 | b5 | b6 | b7 | E |
|---|----|----|----|----|----|----|----|---|
|   | LSB |   |   |   |   |   | MSB |   |

Fig. 3B

| S | b1 b2 b3 b4 b5 b6 b7 b8 | P | b1 b2 ... b7 b8 | P | b1 b2 ... b7 b8 | P | b1 b2 ... b8 | P | E |

CIRCUIT FOR GENERATING CLOCK SIGNAL AND DECODING DATA SIGNAL FOR USE IN CONTACTLESS INTEGRATED CIRCUIT CARD

FIELD OF THE INVENTION

The present invention is directed to a contactless integrated circuit (IC) card, and in particular to a circuit for generating a clock signal from a received radio frequency signal and for restoring data in the contactless IC card.

BACKGROUND OF THE INVENTION

Since the advent of the credit card in the 1920's, a number of electronic information cards have evolved such as debit (or cash) cards, credit cards, identification cards, department store cards, and the like. Recently, integrated circuit (IC) cards, named as such since a minicomputer is integrated into the cards, have become popular for their convenience, stability and numerous applications.

In general, IC cards are of a shape such that a thin semiconductor device is attached to a plastic card of the same size as a credit card. As compared to a conventional credit card, including a magnetic media strip, IC cards enjoy various benefits such as high stability, write-protected data, and high security. For this reason, IC cards have become widely accepted as the multimedia information media of the next generation.

IC cards can be roughly classified as a contact IC card, a Contactless IC Card (CICC), and a Remote Coupling Communication Card (RCCC). In connection with the CICC, ISO (the International Organization for Standardization) and IEC (the International Electrotechnical Commission) have formed a specialized system for worldwide standardization. Particularly international standard ISO/IEC 14443 specifies the physical characteristics of proximity cards, radio frequency power and signal interface, initialization and anticollision, and transmission protocol. Under ISO/IEC 14443, the contactless IC cards incorporate an integrated circuit (IC) that performs data processing and/or memory functionality. The possibility of contactless card technology is a result of the achievement of signal exchange via inductive coupling with a proximity coupling device (that is, a card reader) and to ability to supply power to the card without the use of galvanic elements (i.e., the absence of an ohmic path from the external interfacing equipment to the integrated circuit(s) contained within the card). A card reader produces an energizing radio frequency (RF) field which is coupled to the card in order to transfer power and which is modulated for communication. The frequency fc of the RF operating field is 13.56 MHz±7 kHZ.

FIGS. 1A and 1B illustrate concepts of communication signals for Type A and Type B interfaces of the ISO/IEC 14443. The communication signal of FIG. 1A is transferred from a card reader to a contactless IC card, and the communication signal of FIG. 1B is transferred from the contactless IC card to the card reader. The ISO/IEC 14443 protocol describes two communication signal interfaces, Type A and Type B. Under the communication signal interface Type A, communication from a card reader to a contactless IC card utilizes the modulation principle of ASK 100% of the RF operating field and a Modified Miller code principle. The bit rate for the transmission from the card reader to the contactless IC card is fc/128, that is, 106 kbps (kbit/s). Transmission from the contactless IC card to the card reader is coded by the Manchester code principle and then modulated by the On-Off Key (OOK) principle. Presently, cards that are managed by the communication signal interface of Type A in subways and buses of Seoul, Korea, generate timing of a constant interval of time using an ASK-modulated signal received from a card reader, and receive and transmit data one bit at a time.

When data is transferred from an IC card to a card reader, power is stably provided to the IC card from the card reader. However, when data is transferred to the IC card from the card reader, a pause period t2 as shown in FIG. 2 is created. Namely, power to the card reader from the IC card is interrupted during the pause period t2. At that time, a clock signal generated in an RF receiver has a discontinuous waveform. Under these conditions, it is difficult to maintain the specified bit rate of 106 kps for the ISO/IEC 14443 Type A protocol, because a synchronous clock signal for transmission and receipt is generated by dividing such a clock signal having a discontinuous period.

FIGS. 3A and 3B show data frames of ISO/IEC 14443 Type A data. FIG. 3A illustrates a short frame that is used to initiate communication and consists of a start signal for communication S, 7 data bits transmitted in an LSB-first orientation b1–b7, and an end signal for communication E in this order. FIG. 3B illustrates standard frames that are used for data exchange and consist of a start of communication S, 8 data bit+odd parity bits b1–b7 and P, and an end of communication E. The LSB of each byte is transmitted first. Each byte is followed by an odd parity bit P. The parity bit P is set such that the number of 1s is odd (b1 to b8 and P).

A conventional decoding circuit in a contactless IC card extracts respective bits from an RF signal received in synchronization with a synchronous clock signal, separates the extracted bits into a start bit S, data bits b1–b7 and an end bit E, and detects received data from the separated bit information. A synchronous clock signal having no discontinuous period (that is, a pause period) is required in order to enable the decoding circuit to operate normally.

There is thus a need for generating a synchronous clock signal of a constant frequency from a radio frequency signal having a discontinuous or pause period t2 as shown in FIG. 2 for contactless IC card technology.

SUMMARY OF THE INVENTION

It is therefore an object of the invention to provide a circuit capable of producing a synchronous clock signal of a constant frequency from a received RF signal without a pause period in a contactless integrated circuit card.

It is another object of the invention to provide a circuit capable of precise restoration of data from a received RF signal in a contactless integrated circuit card.

In accordance with one aspect of the present invention, a contactless integrated circuit card includes a device which generates a clock signal and decodes data. The device includes a receiver for receiving a radio frequency (RF) signal having a pause period and a divider for dividing the received RF signal to provide a divided signal. The RF signal is, for example, based on an ISO-14443 Type A interface. A first counter counts a period of the divided signal at each non-pause period of the received RF signal, and a second counter counts the period of the divided signal. A decoder generates a synchronous clock signal and a decoded data signal in response to outputs of the first and second counters.

In this embodiment, the second counter is reset by the synchronous clock signal, and the first counter is reset during the pause period of the RF signal. In particular, the second counter is reset at a falling edge of the synchronous clock signal.

In a preferred embodiment, the decoder further generates a signal indicating an end of a received frame in response to the outputs of the first and second counters.

In accordance with another aspect of the present invention, a contactless integrated circuit card includes a data restoring device which is formed of a receiver for receiving an RF signal having a pause period and extracting data and clock signals from the received RF signal; a divider for dividing the clock signal to generate a divided clock signal; a first counter for counting a period of the divided clock signal at each non-pause period of the data signal; a second counter for counting a period of the divided clock signal; and a decoder for generating a synchronous clock signal and a decoded data signal in response to outputs of the first and second counters.

In a preferred embodiment, the second counter is reset by the synchronous clock signal, in particular, at a falling edge of the synchronous clock signal, and the first counter is reset at a start of the pause period of the data signal.

In a preferred embodiment, the RF signal is based on an ISO-14443 Type A interface, and the decoder further generates a signal indicating an end of a received frame in response to the outputs of the first and second counters. An OR gate is further provided which receives a reset signal for resetting the card and the data signal. The first counter is reset by an output of the OR gate.

In a preferred embodiment, a reset controller is further provided which generates a reset signal in response to the synchronous clock signal. At this time, the second counter is reset by the reset signal from the reset controller. In particular, the divider is formed of a plurality of division units connected in series between an input terminal and an output terminal, wherein the input terminal receives the clock signal from the receiver and each division unit divides an input by N (N is an integer); and a selector for selecting one of outputs of the division units in response to an external selection signal, as the divided clock signal.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A and 3B are diagrams showing data frames for ISO/IEC 14443 Type A protocol;

DETAILED DESCRIPTION OF PREFERRED EMBODIMENTS

The preferred embodiment of the invention will be more fully described with reference to the attached drawings.

Figure 1A:
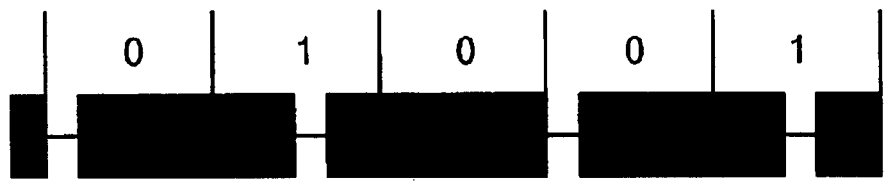
FIGS. 1A and 1B are diagrams showing communication signals for Type A and Type B interfaces under the ISO/IEC 14443 protocol.
Figure 1B:
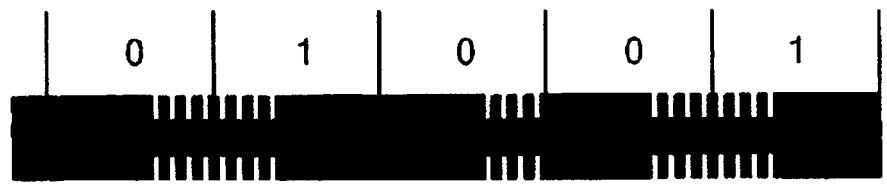
Figure 2:
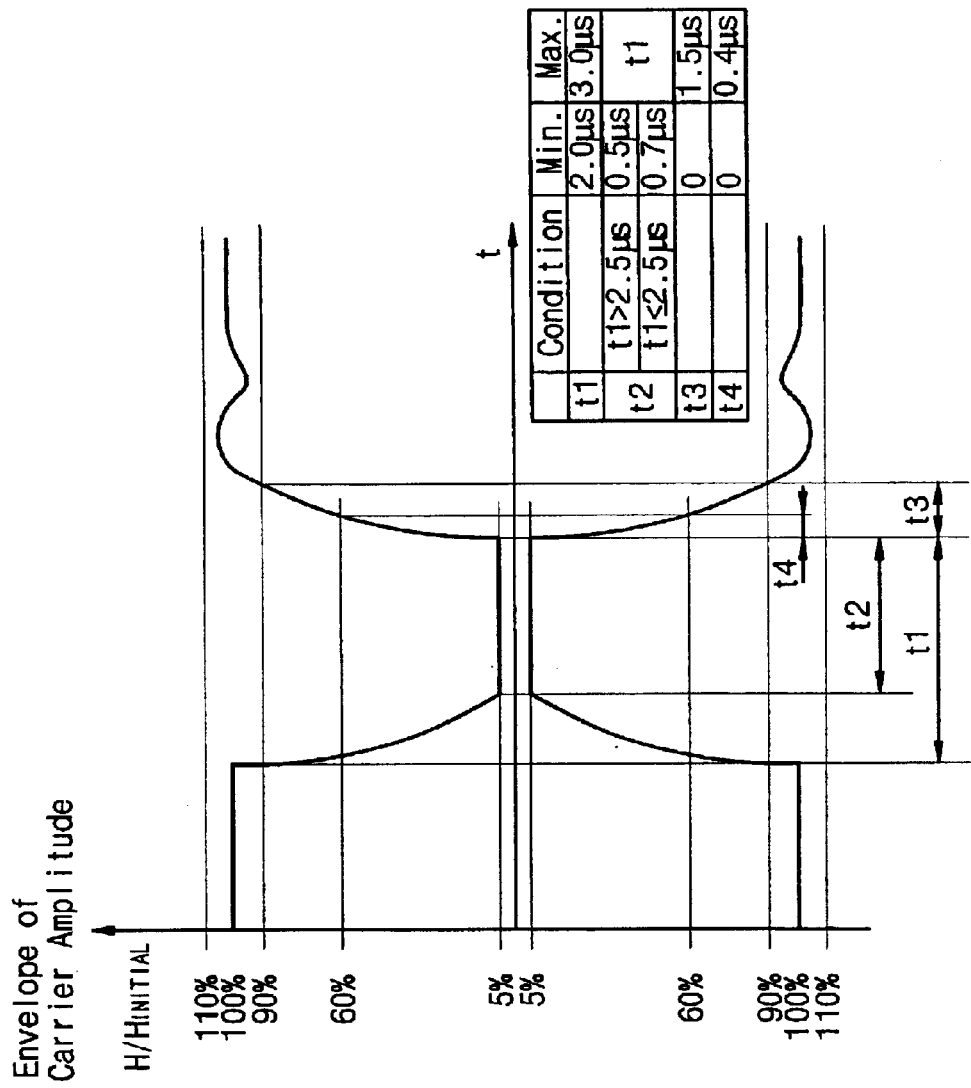
FIG. 2 is a waveform diagram showing a signal transferred from a card reader to an integrated circuit card.
Figure 4:
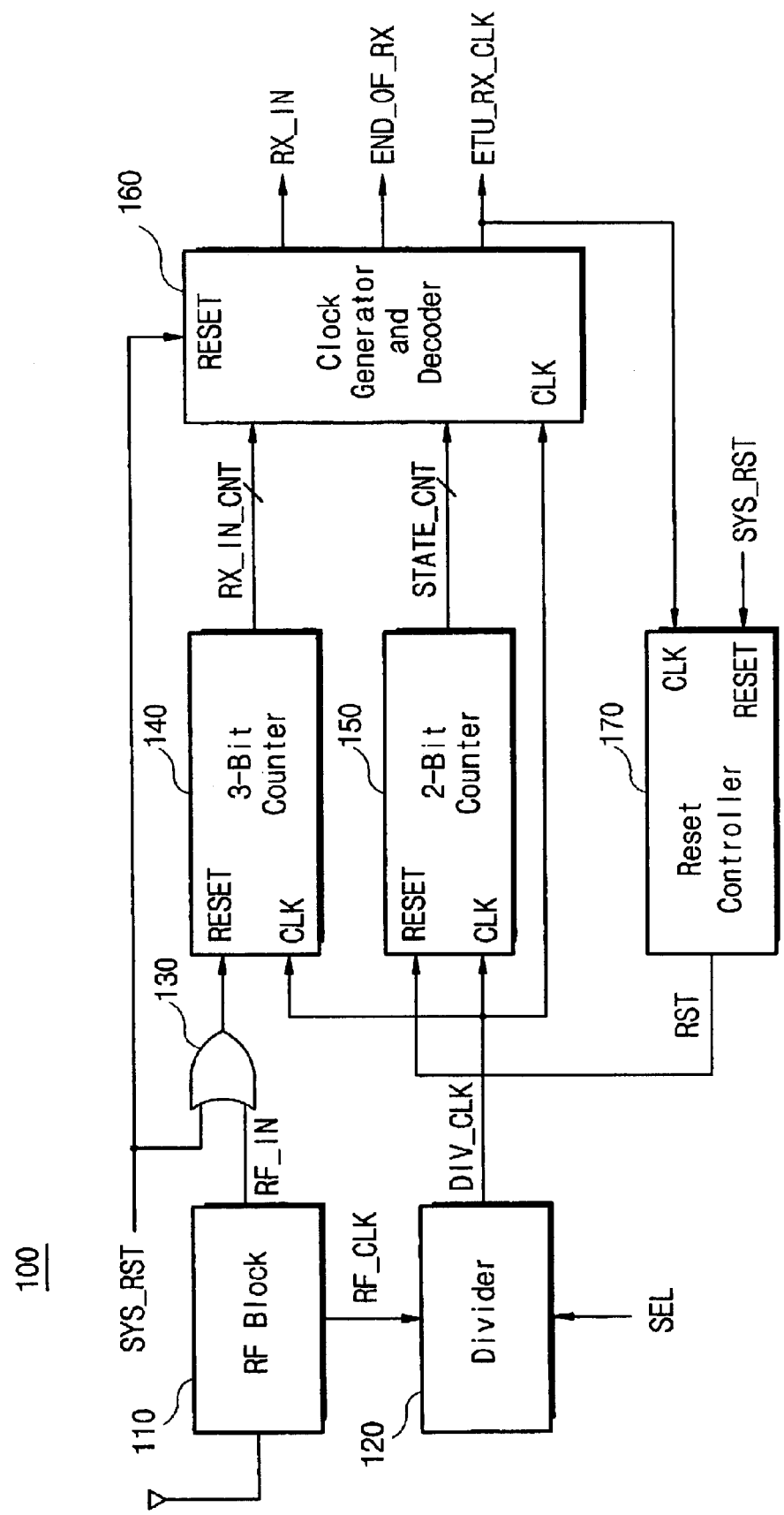
FIG. 4 is a block diagram of a clock generating and data restoring circuit of a contactless integrated circuit card according to the present invention.

FIG. 4 is a block diagram of a clock generating and data restoring circuit of a contactless integrated circuit card according to the present invention. Referring to FIG. 4, a clock generating and data restoring circuit is incorporated into a contactless IC card and includes an RF block 110, a clock divider 120, an OR gate 130, a 3-bit counter 140, a 2-bit counter 150, a clock generator and decoder block 160, and a reset controller 170.

The RF block 110 receives an RF signal, for example having a frequency of 13.56 MHz and a bit rate of 106 kbps based on an ISO/IEC 14443 Type A protocol, and converts the received signal into a clock signal RF_CLK and a data signal RF_IN that are appropriate for a digital circuit. The clock divider 120 divides the clock signal RF_CLK from the block 110 to generate a divided clock signal DIV_CLK. As will be described hereinafter, the clock divider 120 generates various frequencies of clock signals and outputs one of the clock signals in response to a selection signal SEL. Gate 130 receives a system reset signal SYS_RST and the data signal RF_IN from the block 110.

Continuing to refer to FIG. 4, the 3-bit counter 140 is reset by an output of the gate 130 and counts the period of the divided clock signal DIV_CLK from the clock divider 120. The output RX_IN_CNT of the 3-bit counter 140 sequentially varies from '0' to '7' (in a binary number, from '000' to '111'). The 2-bit counter 150 is reset by a reset signal RST generated from the reset controller 170 and counts the period of the divided clock signal DIV_CLK from the clock divider 120. The output STATE_CNT of the 2-bit counter 150 sequentially varies from '0' to '2' (in a binary number, from '00' to '10').

The clock generator and decoder block 160 operates in response to the outputs RX_IN_CNT and STATE_CNT from the counters 140 and 150, and generates a synchronous clock signal ETU_RX_CLK, a decoded data signal RX_IN, and a frame end signal END_OF_RX. The reset controller 170 is reset by the system reset signal SYS_RST and generates the reset signal RST in response to the synchronous clock signal ETU_RX_CLK.

Figure 5:
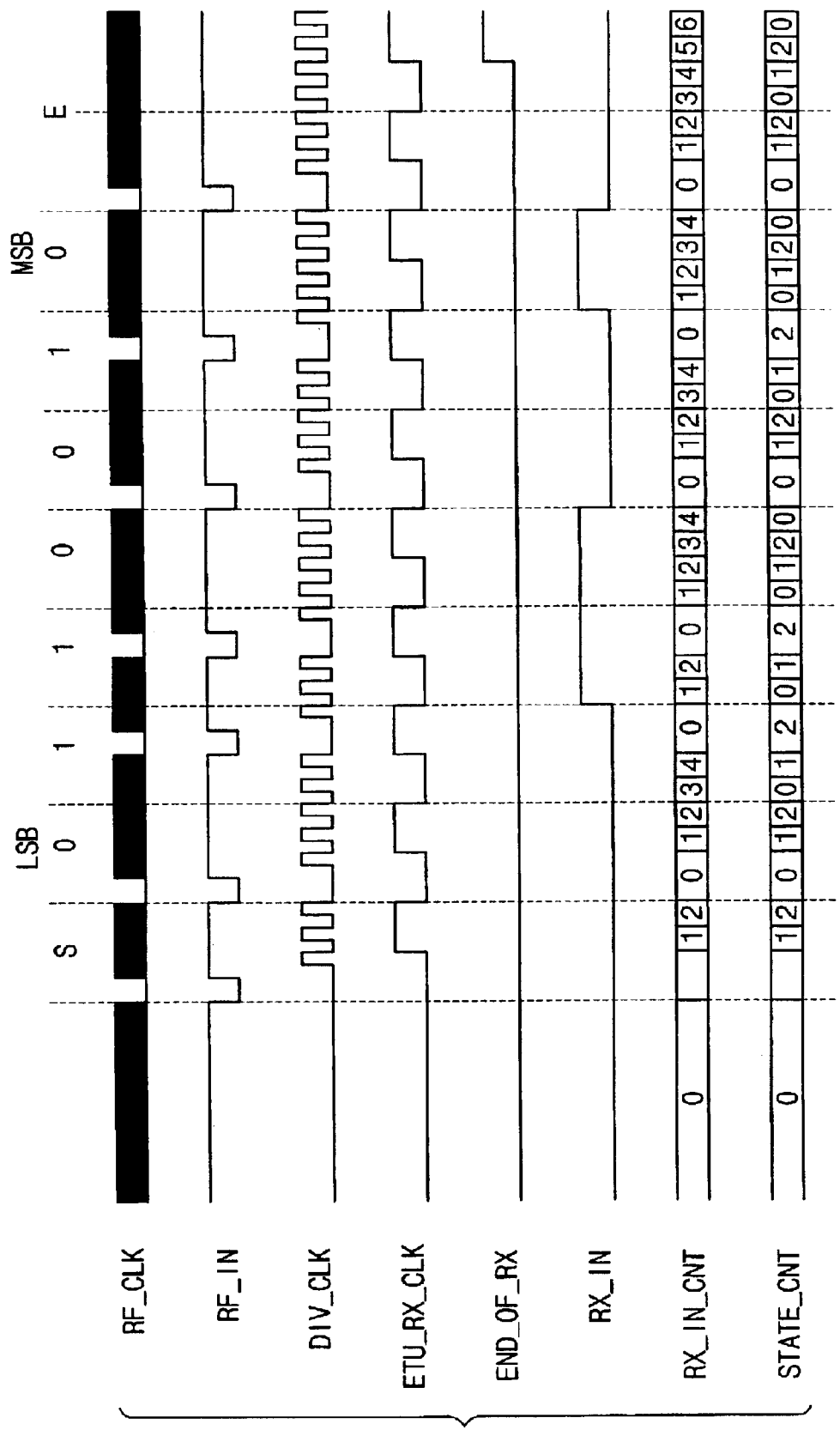
FIG. 5 is a timing diagram of the operation of various signals of the circuit of FIG. 4.

FIG. 5 is a timing diagram illustrating the response and operation of various signals of the circuit of FIG. 4, in the case where a short frame is used to initiate communication. The operation of a clock generating and data restoring circuit will now be fully described below with reference to FIGS. 4 and 5.

Referring to FIGS. 4 and 5, before a short frame is received from a card reader (not shown), the 3-bit counter 140 and the reset controller 170 are reset by a system reset signal SYS_RST. At this time, a 2-bit counter 150 is reset by a reset signal RST from the reset controller 170. When reset, output values RX_IN_CNT and STATE_CNT from the counters 140 and 150 become '0'. As illustrated in FIG. 5, before the short frame is received, the RF block 110 outputs a data signal RF_IN at a high level.

When a start bit S being a first bit of the short frame is received, the data signal RF_IN from the RF block 110 transitions from a high level (logic '1') to a low level (logic '0'). At this time, the clock divider 120 begins to divide the clock signal RF_CLK. Assuming that a period of each bit of a short frame illustrated in FIG. 3A is an ETU (Elementary Time Unit), in this embodiment, the divided clock signal DIV_CLK output by the clock divider 120 has a period of $$\frac{ETU}{4}.$$

After reset, the counters 140 and 150 perform a count operation in response to the falling edge of the divided clock signal DIV_CLK. The clock generator and decoder block 160 generates rising and falling edges of a synchronous clock signal ETU_RX_CLK when the outputs RX_IN_CNT and STATE_CNT of the counters 140 and 150 have specified values.

The following table shows the conditions under which the synchronous clock signal ETU_RX_CLK is generated in response to the outputs RX_IN_CNT and STATE_CNT of the counters 140 and 150.

TABLE 1

| ETU_RX_CLK | RX_IN_CNT [0] | STATE_CNT [0] |
|---|---|---|
| Rising Clock | 0 | 0 |
|  | 0 | 1 |
|  | 1 | 1 |
|  | 2 | 1 |
|  | 4 | 1 |
|  | 5 | 1 |
|  | 6 | 1 |
| Falling Clock | 0 | 2 |
|  | 2 | 0 |
|  | 2 | 2 |
|  | 3 | 0 |
|  | 4 | 0 |
|  | 6 | 0 |
|  | 7 | 0 |

For example, when the output RX_IN_CNT of the 3-bit counter 140 is 1 and the output STATE_CNT of the 2-bit counter 150 is 1, a rising edge of the synchronous clock signal ETU_RX_CLK is established. When the output RX_IN_CNT of the 3-bit counter 140 is 2 and the output STATE_CNT of the 2-bit counter 150 is 2, a falling edge of the synchronous clock signal ETU_RX_CLK is established.

The reset controller 170 of FOG. 4 activates a reset signal RST in response to a falling edge of the synchronous clock signal ETU_RX_CLK from the clock generator and decoder block 160. The 2-bit counter 150 is reset by activation of the reset signal RST. The 3-bit counter 140 is reset when a data signal RF_IN from the RF block 110 transitions from a high level to a low level. As the above operations are repeated, the synchronous clock signal ETU_RX_CLK of a frequency 0.11 MHz is produced.

Meanwhile, the clock generator and decoder block 160 generates a decoded data signal RX_IN in a response to the outputs RX_IN_CNT and STATE_CNT of the counters 140 and 150.

The following table shows the conditions under which the decoded data signal RX_IN is generated in response to the outputs RX_IN_CNT and STATE_CNT of the counters 140 and 150.

TABLE 2

| RF_IN | RX_IN_CNT | STATE_CNT | 1 ETU |
|---|---|---|---|
| LOGIC 0 | 2 | 2 | 0111 |
|  | 4 | 0 | 1111 |

TABLE 2-continued

| RF_IN | RX_IN_CNT | STATE_CNT | 1 ETU |
|---|---|---|---|
|  | 5 | 2 |  |
|  | 7 | 2 |  |
| LOGIC 1 | 0 | 2 | 1101 |
|  | 3 | 0 |  |
|  | 7 | 0 |  |

The data signal RF_IN is the modified miller code, and indicates logic '0' when its value is '0111' or '111' during one ETU and indicates logic '1' when its value is '1101'. For example, when an output RX_IN_CNT of the counter 140 is '0' and the output STATE_CNT of the counter 150 is '2', the block 160 outputs a decoded data signal RX_IN at a high level. When the output RX_IN_CNT of the counter 140 is '4' and the output STATE_CNT of the counter 150 is '0', the block 160 outputs a decoded data signal RX_IN at a low level. According to this condition, received data RF_IN "1111011101111101" is converted into decoded data RX_IN "0001".

A method for detecting an end bit E indicating the end of one frame is as follows. The block 160 generates a frame end signal END_OF_RX in response to output signals RX_IN_CNT and STATE_CNT from the counters 140 and 150. The following table shows the conditions under which the frame end signal END_OF_RX is generated in response to the values of output signals RX_IN_CNT and STATE_CNT of the counters 140 and 150.

TABLE 3

| RX_IN | RX_IN_CNT | STATE_CNT |
|---|---|---|
| END_OF_RX | 6 | 0 |
|  | 7 | 0 |

As is understood from the table 3, when the output value RX_IN_CNT of the 3-bit counter 140 is 6 or 7 and the output value STATE_CNT of the 2-bit counter 150 is 0, the clock generator and decoder 160 activates the frame end signal END_OF_RX at a high level.

In this manner, the present invention is capable of receiving data appropriate to ISO/IEC 14443 Type A protocol by generating a synchronous clock signal ETU_RX_CLK of 0.11 MHz and a decoded data signal RX_IN.

Figure 6:
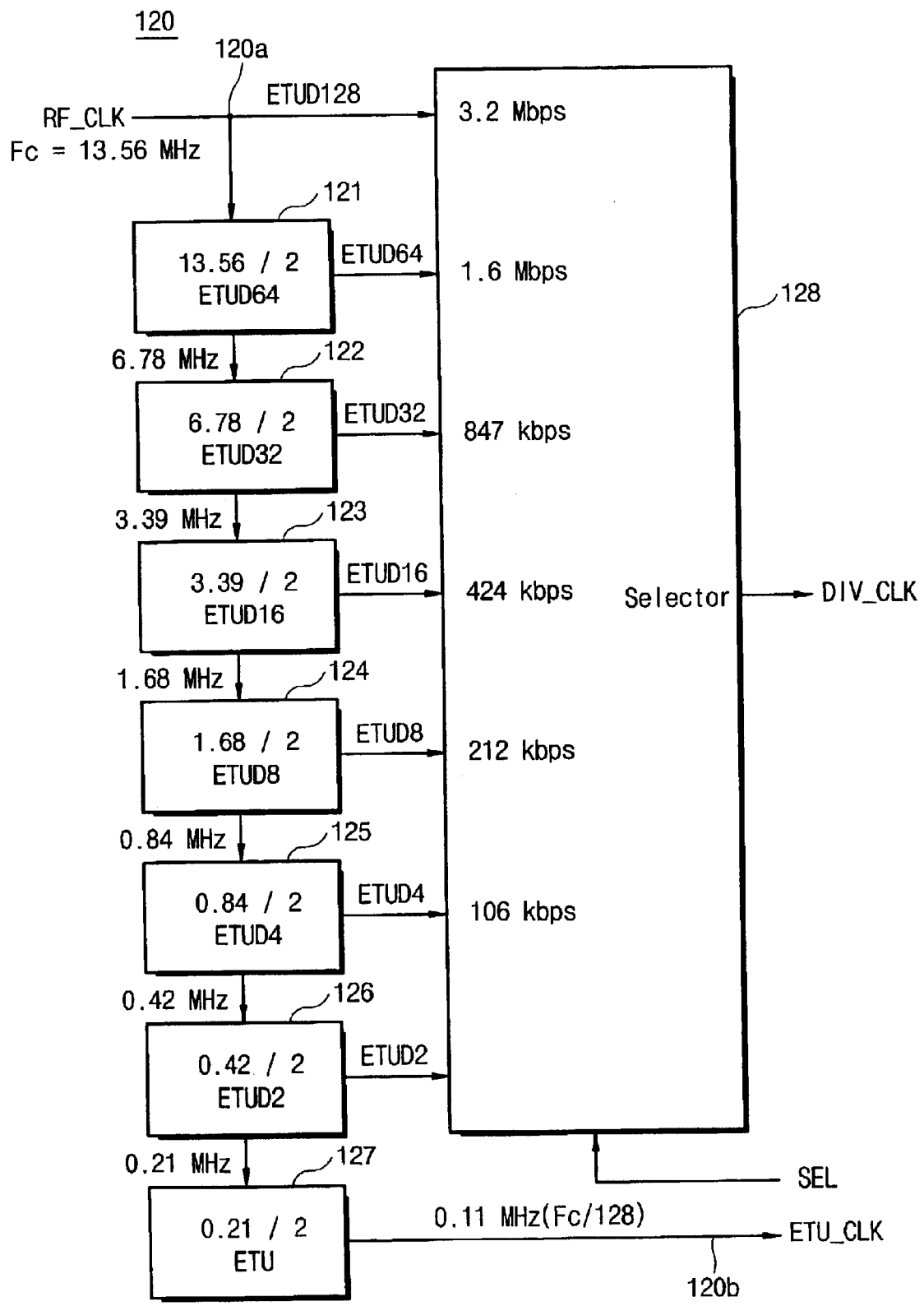
FIG. 6 is a preferred embodiment of the clock divider of FIG. 4.

Although the present invention is described using a bit rate of 106 kbps, the present invention can support various bit rates. FIG. 6 is an exemplary embodiment of the clock divider 120 of FIG. 4. Referring to FIG. 4, a clock divider 120 includes a plurality of dividers (or division units) 121–127 and a bit-rate selector 128. The dividers 121–127 are connected in series between an input terminal 120*a* and an output terminal 120*b*. Each of the dividers 121–127 divides the frequency of a received signal by 2. The bit-rate selector 128 selects one of divided clock signals ETUD2-ETUD64 from the dividers 121–127, as an output DIV_CLK.

According to the ISO/IEC 14443 standard, the clock signal RF_CLK has a frequency of 13.56 MHz. In order to support a bit rate of 106 kbps, a clock signal ETUD4 from the divider 125 is used as a clock signal DIV_CLK that is supplied to 2-bit and 3-bit counters 140 and 150 and a clock generator and decoder block 160. For example, in order to support a bit rate of 212 kbps, a clock signal ETUD8 from the divider 124 is used as the clock signal DIV_CLK that

What is claimed is:

1. A device for generating a clock signal and decoding data for use in a contactless integrated circuit device comprising:

a receiver for receiving a radio frequency (RF) signal having a pause period;

a divider for dividing the received RF signal to provide a divided signal;

a first counter for counting a period of the divided signal at each non-pause period of the received RF signal;

a second counter for counting a period of the divided signal; and a decoder for generating a synchronous clock signal and a decoded data signal in response to outputs of the first and second counters, wherein the second counter is reset by the synchronous clock signal.

2. The device according to claim 1, wherein the first counter is reset during the pause period of the RF signal.

3. The device according to claim 1, wherein the second counter is reset at a falling edge of the synchronous clock signal.

4. The device according to claim 1, wherein the RF signal is based on an ISO-14443 Type A interface.

5. The device according to claim 4, wherein the decoder further generates a signal indicating an end of a received frame in response to the outputs of the first and second counters.

6. A data restoring device for use in a contactless integrated circuit card comprising:

a receiver for receiving an RF signal having a pause period and extracting data and clock signals from the received RF signal;

a divider for dividing the clock signal to generate a divided clock signal;

a first counter for counting a period of the divided clock signal at each non-pause period of the data signal;

a second counter for counting a period of the divided clock signal; and a decoder for generating a synchronous clock signal and a decoded data signal in response to outputs of the first and second counters, wherein the second counter is reset by the synchronous clock signal.

7. The device according to claim 6, wherein the first counter is reset at a start of the pause period of the data signal.

8. The device according to claim 7, wherein the first counter is a 3-bit counter.

9. The device according to claim 6, wherein the second counter is reset at a falling edge of the synchronous clock signal.

10. The device according to claim 9, wherein the second counter is a 2-bit counter.

11. The device according to claim 10, wherein an output of the second counter sequentially varies between '0' and '2'.

12. The device according to claim 6, wherein the RF signal is based on an ISO-14443 Type A interface.

13. The device according to claim 12, wherein the decoder further generates a signal indicating an end of a received frame in response to the outputs of the first and second counters.

14. The device according to claim 6, further comprising an OR gate for receiving a reset signal for resetting the card and the data signal, wherein the first counter is reset by an output of the OR gate.

15. The device according to claim 6, further comprising a reset controller for generating a reset signal in response to the synchronous clock signal, wherein the second counter is reset by the reset signal from the reset controller.

16. The device according to claim 6, wherein the divider includes:

a plurality of division units connected in series between an input terminal and an output terminal, wherein the input terminal receives the clock signal from the receiver and each division unit divides an input signal by N (N is an integer); and a selector for selecting one of outputs of the division units in response to an external selection signal, as the divided clock signal.

* * * * *